May 27, 1952  E. G. STEFFEN  2,597,961
PRESSURE REGULATING DEVICE
Filed Aug. 31, 1950

INVENTOR.
ELMER G. STEFFEN
BY
Woodling and Krost,
attys.

Patented May 27, 1952

2,597,961

UNITED STATES PATENT OFFICE 2,597,961

PRESSURE REGULATING DEVICE

Elmer G. Steffen, University Heights, Ohio, assignor to Alar Products, Inc., a corporation of Ohio Application August 31, 1950, Serial No. 182,610

12 Claims. (Cl. 267—1)

The invention relates in general to variable pressure regulators and more particularly to pressure regulating devices for exerting a variable force upon a flexible diaphragm. The invention is, in a specific embodiment thereof, directed to a pressure breathing cap for use with a pressure breathing type of diluter demand oxygen regulator. The diluter demand oxygen regulator has a flexible diaphragm at one end thereof positioned above and covering a regulating chamber; and the user of the oxygen system, by inhaling, will evacuate this regulating chamber, thus causing the diaphragm to collapse. By so doing an oxygen valve is opened to admit oxygen to this regulating chamber under pressure, and the force thereof will again restore the diaphragm to the normal position. The pressure breathing cap fits on the opposite side of this flexible diaphragm and has a manually operable knob to adjust the tension of a spring which, through a linkage system, exerts a variable mechanical force on the upper side of this diaphragm. The oxygen in the regulating chamber goes next to a mixing chamber where air is mixed with the oxygen. The ratio of oxygen and air is automatically varied with altitude and the mixing chamber mixes oxygen with air in ever increasing proportion until about 35,000 feet is reached, at which time the user is breathing 100 per cent pure oxygen. The pressure breathing cap is used at altitudes above about 35,000 feet in order to supply oxygen to the mixing chamber under increasing pressures sufficient to maintain the same oxygen concentration in his body as when he is breathing pure oxygen from the demand regulator at an altitude of about 35,000 feet.

An object of the invention is to provide a pressure breathing cap for a demand oxygen regulator wherein one end of an extension spring is moved to exert a varying force through the lever means onto a flexible diaphragm of the demand oxygen regulator.

Another object of the invention is to provide a variable pressure regulator having an extension spring with one end moved by the rotation of a knob and the other end connected through lever means so that a portion of the lever moves along a path in a plane which is substantially parallel to a plane containing the axis of the spring.

Another object of the invention is to provide a pressure regulating device for a flexible diaphragm wherein a housing carries a shaft which is generally axially aligned with the desired path of movement of the diaphragm and wherein an extension spring lies generally parallel to the diaphragm and one end of this spring is extended by rotation of the shaft to exert a varying force on a lever which is pivotally movable in a plane generally parallel to the axis of the shaft and parallel to a plane which contains the path of movement of the diaphragm.

Other objects and a fuller understanding of the invention may be had by referring to the following description and claims, taken in conjunction with the accompanying drawing, in which:

Figure 1:
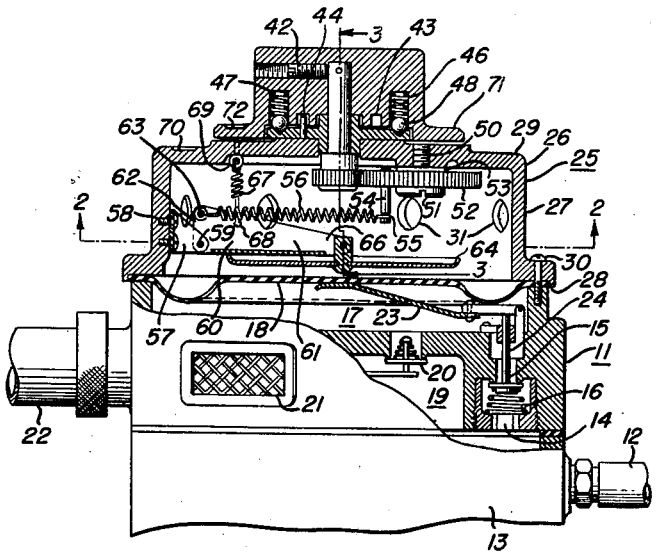
Figure 1 is a side elevation view partially in section of a demand oxygen regulator having a flexible diaphrgam and covered by a pressure breathing cap.
Figure 2:
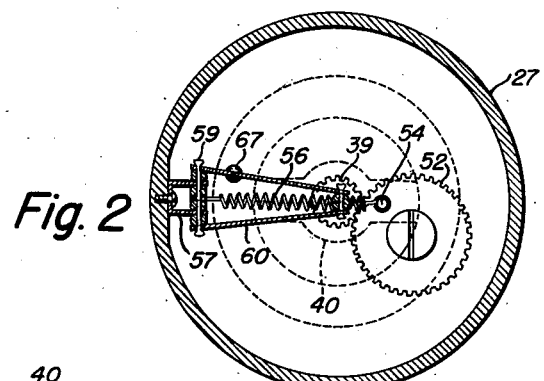
Figure 2 is a sectional view taken along the line 2—2 of Figure 1.
Figure 3:
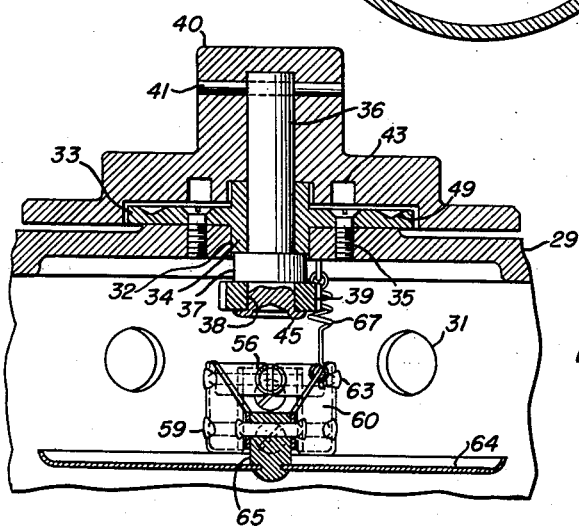
Figure 3 is an enlarged sectional view taken on the line 3—3 of Figure 1.

The Figures 1, 2 and 3 illustrate the preferred form of the invention wherein the reference character 11 denotes a diluter demand oxygen regulator having an oxygen inlet 12 at high pressure to a first stage pressure regulator 13. An outlet 14 of the first stage is provided at a reduced pressure in the order of 5 or 10 pounds per square inch to a second stage valve 15. The second stage valve 15 is closed by a valve spring 16 and the gas pressure on the underside of the valve 15. The oxygen flowing through the second stage valve 15 enters a regulating chamber 17 covered by a flexible diaphrgam 18. Oxygen from the regulating chamber 17 then flows to a mixing chamber 19 through an oxygen metering port 20 regulated by mechanism not shown. In the mixing chamber 19 the oxygen coming from the regulating chamber 17 is mixed with air entering from the screened port 21 and thence goes to the outlet 22 of the regulator 11. As the user inhales, this tends to evacuate the mixing chamber 19 and likewise the regulating chamber 17 which tends to move the flexible diaphrgam 18 downwardly. A regulating lever 23 is thus moved to move a valve stem 24 to open the second stage valve 15. This admits oxygen to the regulating chamber 17 to again restore the diaphragm 18 to its normal position such as is shown in the Figure 1. The mechanism not shown in the mixing chamber 19 of the regulator 11 automatically changes the proportions of air and oxygen in accordance with atmospheric pressure until an atmospheric pressure corresponding to about 35,000 feet above sea level is attained. At this altitude 100 per cent oxygen is being delivered and the screened air port 21 is completely blocked off. Above about 35,000 feet a pressure breathing cap 25 comes into play. The purpose of the pressure breathing cap 25 is to exert a variable force upon the upper side of the flexible diaphrgam 18, thereby tending to open the second stage valve 15 against the urging of the gas pressure within the regulating chamber 17. Thus, at altitudes above 35,000 feet the pressure breathing cap 25 permits oxygen under slight pressure to be delivered to the user.

The pressure breathing cap 25 comprises a circular cup-shaped housing 26 having an annular side wall 27, a circular open end 28 and a circular closed end 29. The open end 28 is adapted to engage the periphery of the upper side of the flexible diaphragm 18 and be fastened to the body 11 by any suitable means, such as the screws 30. The annular side wall 27 has a plurality of apertures 31 so that the upper side of the diaphragm 18 is open to atmosphere. Centrally disposed in the closed end 29 is an aperture 32. A detent plate 33 covers part of the upper side of the closed end 29 and has a bearing portion 34. The detent plate is fastened to the housing 26 by three screws 35. The bearing portion 34 may also have a press fit with the aperture 32 of the closed end 29. A shaft 36 is journaled in the bearing portion 34 and has at the lower end thereof an enlarged section 37 and a reduced section 38 which carries a spur gear pinion 39. The shaft 36 has a head 45 against which the spur gear pinion 39 bears, and this pinion is fixedly attached to the shaft 36.

A knob 40 is carried by the upper end of the shaft 36, as by the pin 41 and set screw 42. A groove 43 of about 330 degrees is provided in the underside of the knob 40, and cooperates with a stop pin 44 in the detent plate 33 to limit rotation of the knob 40. Two bore holes 46 in the knob 40 carry detent springs 47 which bear against the detent balls 48. The balls 48 are adapted to engage a series of depressions 49 in the upper surface of the detent plate 33. The force of the springs 47 urges the knob 40, and hence the shaft 36 upwardly to thus keep the spur gear pinion 39 closely adjacent the underside of the detent plate 33.

A stub shaft 50 is fastened to a boss on the underside of the closed end 29 and has a head 51. An idler spur gear 52 meshes with the gear pinion 39 and is journaled on the stub shaft 50 between the head 51 and a spacer washer 53. A pin 54 depends from the idler gear 52 and has a circumferential groove 55 thereon for engaging an extension spring 56. A support bracket 57 is fastened to the inside of the side wall 27 by the screws 58 and carries a fulcrum pin 59 for pivotally supporting a bell crank lever 60. The lever 60 has a long leg 61 extending to the axis of the housing 26 and also has a short leg 62 extending inwardly of the housing 26. A spring pin 63 engages the short leg 62 and provides an engagement means for the extension spring 56. A disc 64 has a hub 65 which is pivotally attached to the outer end 66 of the long leg 61. The pivotal attachment is so that the disc 64 may remain parallel to the diaphragm 18 despite changes in attitude of the lever 60. A second extension spring 67 engages an aperture 68 in the lever 60 and engages an eye 69 fastened to the closed end 29.

The upper surface of the closed end 29 has an index mark 70 molded as an integral part of the housing 26. Also the flange 71 of the knob 40 has integral therewith indicia 72 which in cooperation with the index mark 70 gives an indication to the user of the pressure breathing cap 25 of the position of the knob 40, and hence the position of the diaphragm disc 64. The indicia 72 is cast as an integral part of the flange 71 of the knob 40.

In operation of the pressure regulator below 35,000 feet, the knob 40 is rotated to the position shown in Figures 1 and 3 wherein substantially no force is applied to the extension spring 56, and hence the second extension spring 67 retains the disc 64 in its uppermost position. In this position the pin 54 will be positioned on the idler gear 52 closest to the support bracket 57. In this condition the tension on the extension spring 56 is less than on the second extension spring 67. The knob 40 is adapted to rotate about 320 degrees through a plurality of positions as determined by the detent balls 48 cooperating with the depressions 49. Rotation of the knob in a counterclockwise direction, as viewed in Figure 2, will progressively rotate the pinion 39 and hence rotate the idler gear 52 in a clockwise direction. The rotation of this idler gear is approximately 90 degrees since there is about a 3.6:1 gear ratio between the idler gear 52 and the pinion 39. This clockwise rotation of the idler gear 52 will extend the spring 56 to thus increase the force applied to the short leg 62. The lever 60 thus tends to rotate in a clockwise direction, as viewed in Figure 1, to thus transmit an increasing force downwardly upon the flexible diaphragm 18. This downward movement of the flexible diaphragm 18 will result in actuation of the regulating lever 23, and hence tend to open the second stage valve 15. Oxygen pressure will thereby build up inside the regulating chamber 17 sufficient to counteract the force exerted on the diaphragm 18 by the disc 64. Thus, this pressure breathing cap 25 offers a manual means to the user of the oxygen supply to vary the pressure of the oxygen supplied him.

The method for obtaining initial assembly and calibration of the knob 40 is to assemble the gears 39 and 52 approximately in the position as shown in Figure 2. The pin 54 is adapted to swing approximately 90 degrees and in the position shown is at its closest location to the fulcrum pin 59. The extension spring 56 will thus have the least amount of tension so that the second extension spring 67 may hold the disc 64 away from the diaphragm 18. The knob 40 is next placed upon the shaft 36 and is rotated to one of its limits as determined by the pin 54 and groove 55. This physical limit will be made to correspond with one limit of movement as indicated by the index mark 70 and indicia 72. The set screw 42 would be tightened against the shaft 36 temporarily and may be subsequently loosened and repositioned in order that when the knob 40 is at one of its rotational limits the idler gear 52 is in its correct initial position as shown in Figure 2. Then the pressure breathing cap 25 would be placed in a jig and a hole drilled transversely through the knob 40 and shaft 36 and then the pin 41 inserted to firmly locate the knob 40 relative to the shaft 36. The pin 41 will thus take the torque transmitted from the knob 40 to the shaft 36.

An alternative construction would be to eliminate the second extension spring 67 and have the first extension spring 56 supply a slight compressive force upon the lever 60 when in the initial position as shown in the figures of the drawings. This slight compressive force would insure that the diaphragm disc 64 is raised clear of the diaphragm 18, thus insuring freedom of movement of this diaphragm.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pressure regulating device for exerting a variable force on a flexible diaphragm, comprising, a cup-shaped housing with an open end adapted to engage one side of said diphragm, an end wall in said housing remote from said diaphragm end, said end wall having a central aperture, a shaft journaled in said aperture, detent means acting between said shaft and said housing to establish said shaft in a plurality of positions relative to said housing, means including a gear driven by said shaft and rotatable relative to said housing on an axis substantially parallel to said shaft axis, a portion of said gear adapted to move away from a given point on the interior side wall of said housing upon rotation of said gear in a given direction, lever means having a pivot point secured to said given point of the interior side wall of said housing, and a spring extending and acting between said lever means and said portion of the gear.

2. A pressure regulating device comprising, a cup-shaped housing with an annular side wall and a circular closed end and a circular open end, siad closed end having a central aperture, a shaft journaled in said aperture, a knob fastened to said shaft externally of said housing, detent means acting between said knob and said housing closed end to establish said knob and hence said shaft in a plurality of positions relative to said housing, a spur gear pinion fastened to the inner end of said shaft, an idler gear meshing with said pinion and journaled to said closed end on an axis substantially parallel to said shaft axis, a portion of said idler gear adapted to move away from a given point on the annular side wall of said housing upon rotation of said idler gear in a given direction, a lever having a leg and a pivot point, means for securing said pivot point to said given point on the annular side wall of said housing with said leg extending substantially to the axis of said housing, and an extension spring extending between said lever and said idler gear portion.

3. A pressure regulating device comprising, a cup-shaped housing with an annular side wall and a circular closed end and a circular open end, said closed end having a central aperture, a shaft journaled in said aperture, a knob fastened to said shaft externally of said housing, detent means acting between said knob and said housing closed end to establish said knob and hence said shaft in a plurality of positions relative to said housing, a spur gear pinion fastened to the inner end of said shaft, an idler gear meshing with said pinion and journaled to said closed end on an axis substantially parallel to said shaft axis, a portion of said idler gear adapted to move away from a given point on the annular side wall of said housing upon rotation of said idler gear in a given direction, a lever having a leg and a pivot point, means for securing said pivot point to said given point of the annular side wall of said housing with said leg extending substantially to the axis of said housing, a first extension spring extending between said lever and said idler gear portion, and a second extension spring extending between said lever and said end wall to urge said leg inwardly of said housing.

4. A pressure regulating device comprising, a cup-shaped housing with an annular side wall and a circular closed end and a circular open end, said closed end having a central aperture, a shaft journaled in said aperture, a knob fastened to said shaft externally of said housing, a detent plate fastened to said closed end and disposed under said knob, detent means within said knob for cooperating with said detent plate to establish said knob and hence said shaft in a plurality of positions relative to said housing, means including a gear driven by said shaft and journaled on an axis substantially parallel to said shaft axis, a pin on said gear and adapted to move away from a given point on the annular side wall of said housing upon rotation of said gear in a given direction, a bell crank lever having long and short legs and a pivot point at the juncture thereof, means for securing said pivot point to said given point of the annular side wall of said housing with said long leg extending substantially to the axis of said housing and said short leg extending toward said housing closed end, and an extension spring extending between the free end of said short leg and said pin on said gear.

5. A pressure breathing cap comprising, a cup-shaped housing with an annular side wall and a circular closed end and a circular open end, said closed end having inner and outer surfaces and a central aperture, a shaft journaled in said aperture, a knob fastened to said shaft externally of said housing and covering part of said outer surface, a detent plate fastened to said closed end and disposed under said knob, detent means within said knob for cooperating with said detent plate to establish said knob and hence said shaft in a plurality of positions relative to said housing, a spur gear pinion fastened to the inner end of said shaft and positioned adjacent said inner surface, an idler gear meshing with said pinion and journaled to said closed end on an axis substantially parallel to said shaft axis, a pin depending from said idler gear and adapted to move away from a given point on said annular side wall of said housing upon rotation of said idler gear in a given direction, a bell crank lever having long and short legs and a pivot point at the juncture thereof, means for securing said pivot point to said given point of the annular side wall of said housing with said long leg extending substantially to the axis of said housing and said short leg extending toward said housing closed end, a first extension spring extending between the free end of said short leg and said idler gear pin to urge said long leg outwardly of said housing, and a second extension spring extending between said lever and said closed end to urge said long leg inwardly of said housing.

6. For use with a device having a flexible diaphragm, a cup-shaped housing with an open end adapted to engage one side of said diaphragm, an end wall in said housing remote from said open end, said end wall having a central aperture, and a power train including a shaft journaled in said aperture, a knob fastened to said shaft externally of said housing, means including a gear driven by said shaft and rotatable relative to said housing on an axis substantially parallel to said shaft axis, a portion of said gear adapted to move away from a given point on the interior side wall of said housing upon rotation of said gear in a given direction, lever means having a pivot point secured to said given point of the interior side wall of said housing for operating on said diaphragm, a spring having an axis and capable of exerting its major force therealong, said spring extending between said lever means and said portion of the gear to move said diaphragm under the urging of said spring, and detent means acting between an element of said power train and said housing to establish said element in a plurality of positions relative to said housing.

7. For use with a device having a flexible diaphragm, a cup-shaped housing with an open end adapted to engage one side of said diaphragm, an end wall in said housing remote from said open end, said end wall having a central aperture, a shaft journaled in said aperture, means including a gear driven by said shaft and rotatable relative to said housing on an axis substantially parallel to said shaft axis, a portion of said gear adapted to move away from a given point on the interior side wall of said housing upon rotation of said gear in a given direction, lever means having a pivot point secured to said given point of the interior side wall of said housing, and a spring extending and acting between said lever means and said portion of the gear.

8. A pressure regulating device for exerting a variable force along a first path which is substantially straight over a given working range, comprising, a support, a first member at least partially revoluble about an axis substantially along said given working range of said first path, a second member at least partially revoluble about an axis parallel to said first mentioned axis and driven by said first member, a portion of said second member being displaced from said axes to be movable in an arcuate path in a plane perpendicular to said axes, detent means acting between said one of said members and said support to establish said second member in a plurality of positions relative to said support, lever means having an end movable generally along said first path and pivotally movable in a second plane, and an extension spring lying substantially parallel to said second plane and directly connected to and acting between said second member portion and said lever means.

9. A pressure regulating device for exerting a variable force on a flexible diaphragm, comprising, a cup-shaped housing with an open end engaging one side of a diaphragm, an end wall in said housing remote from said diaphragm end, said end wall having a central aperture, and a power train including a shaft journaled in said aperture, a knob fastened to said shaft externally of said housing, means including a gear driven by said shaft and rotatable relative to said housing on an axis substantially parallel to said shaft axis, a portion of said gear adapted to move away from a given point on the interior side wall of said housing upon rotation of said gear in a given direction, lever means having a pivot point secured to said given point of the interior side wall of said housing and arranged to operate on said diaphragm, a spring having an axis and capable of exerting its major force therealong, said spring extending between said lever means and said portion of the gear to move said diaphragm under the urging of said spring, and detent means acting between an element of said power train and said housing to establish said element in a plurality of positions relative to said housing.

10. A pressure regulating device comprising, a cup-shaped housing with an open end, an end wall in said housing remote from said open end, said end wall having a central aperture, and a power train including a shaft journaled in said aperture, a knob fastened to said shaft externally of said housing, an index point integral with one of said housing and said knob, indicia integral with the other of said housing and said knob for cooperating with said index point to indicate said plurality of positions, the means for fastening said knob to said shaft including a set screw for securing said knob and shaft together in any selected position for initial calibration and including a drive pin for transmitting the torque between said knob and said shaft, means including a gear driven by said shaft and rotatable relative to said housing on an axis substantially parallel to said shaft axis, a portion of said gear adapted to move away from a given point on the interior side wall of said housing upon rotation of said gear in a given direction, lever means having a pivot point secured to said given point of the interior side wall of said housing, and a spring extending between said lever means and said portion of the gear to urge said lever outwardly relative to said open end, and detent means acting between an element of said power train and said housing to establish said element in a plurality of positions relative to said housing.

11. A pressure regulating device for exerting a variable force along a first path which is substantially straight over a given working range, comprising, a support, a power train including, a shaft journaled in said support, a gear driven by said shaft and at least partially revoluble about an axis generally parallel to said first path, a portion of said gear being displaced from said axis to be movable in an arcuate path in a plane perpendicular to said axis, lever means having an end movable generally along said first path and pivotally movable in a second plane; a coil spring having an axis in a plane substantially parallel to said second plane and directly connected to and acting between said gear portion and said lever means alternatively in tension and compression in accordance with the position of said gear, and detent means acting between an element of said power train and said support to establish said element in a plurality of positions relative to said support.

12. A pressure regulating device for exerting a variable force on a flexible diaphragm, comprising, a cup-shaped housing with an open end adapted to engage one side of said diaphragm, an end wall in said housing remote from said diaphragm end, said end wall having a central aperture, and a power train including a shaft journaled in said aperture, a knob fastened to said shaft externally of said housing, means including a gear driven by said shaft and rotatable relative to said housing on an axis substantially parallel to said shaft axis, a portion of said gear adapted to move away from a given point on the interior side wall of said housing, a coil spring extending and acting between said lever means and said portion of the gear alternatively in tension and compression in accordance with the position of said shaft to urge said lever means respectively outwardly and inwardly of said housing open end, and detent means acting between an element of said power train and said housing to establish said element in a plurality of positions relative to said housing.

ELMER G. STEFFEN.

REFERENCES CITED

The following references are of record in the file of this patent:

UNITED STATES PATENTS

| Number | Name | Date |
|---|---|---|
| 978,026 | Jaenichen | Dec. 6, 1910 |
| 1,300,277 | Johnston | Apr. 15, 1919 |
| 2,281,605 | Smith | May 5, 1942 |
| 2,521,310 | Roth | Sept. 5, 1950 |
| 2,523,906 | Holmes | Sept. 26, 1950 |
| 2,534,959 | Deming et al. | Dec. 19, 1950 |
| 2,545,707 | Roth | Mar. 20, 1951 |